United States Patent
Stelle, IV et al.

(10) Patent No.: US 11,777,557 B2
(45) Date of Patent: Oct. 3, 2023

(54) PERSONAL MOBILE SIGNAL EGRESS LOGGING AND AUGMENTED REALITY LEAK LOCATOR

(71) Applicant: Viavi Solutions, Inc., San Jose, CA (US)

(72) Inventors: Raleigh B. Stelle, IV, Indianapolis, IN (US); Ryan Simpson, Greenfield, IN (US)

(73) Assignee: Viavi Solutions Inc., Chandler, AZ (US)

( * ) Notice: Subject to any disclaimer, the term of this patent is extended or adjusted under 35 U.S.C. 154(b) by 168 days.

(21) Appl. No.: 17/314,195

(22) Filed: May 7, 2021

(65) Prior Publication Data

US 2022/0360293 A1 Nov. 10, 2022

(51) Int. Cl.
*H04B 3/46* (2015.01)
*H04W 4/029* (2018.01)
*G06T 11/00* (2006.01)
*G06T 19/00* (2011.01)
*G01S 19/14* (2010.01)
*G06T 11/60* (2006.01)

(52) U.S. Cl.
CPC ............ *H04B 3/46* (2013.01); *G01S 19/14* (2013.01); *G06T 11/00* (2013.01); *G06T 11/60* (2013.01); *G06T 19/006* (2013.01); *H04W 4/029* (2018.02); *G06T 2200/24* (2013.01)

(58) Field of Classification Search
CPC ....... G06T 11/00; G06T 11/60; G06T 19/006; G06T 2200/24; H04B 3/46; G01S 19/14; H04W 4/029
See application file for complete search history.

(56) References Cited

U.S. PATENT DOCUMENTS

| | | | |
|---|---|---|---|
| 2004/0210938 A1* | 10/2004 | Eckenroth | H04N 17/02 348/192 |
| 2013/0004179 A1* | 1/2013 | Nielsen | H04N 17/00 398/115 |
| 2014/0330511 A1* | 11/2014 | Tison | G06T 19/006 701/428 |
| 2021/0132133 A1* | 5/2021 | Wolcott | G01R 31/086 |
| 2022/0276295 A1* | 9/2022 | Matsubara | G01R 29/12 |

* cited by examiner

*Primary Examiner* — King Y Poon
*Assistant Examiner* — Vincent Peren
(74) *Attorney, Agent, or Firm* — DLA PIPER LLP

(57) ABSTRACT

A system, method and computer application to log signal egress (leakage signal) readings from a test instrument during a "walkout" mode where the technician and test instrument have left a vehicle and troubleshooting is being performed on foot. A unique troubleshooting and discovery dataset is created and capable of revealing problems not previously discoverable using vehicle mounted test instruments. In addition, the dataset may be used for quality control and other purposes such as e.g., providing a report or mapping of the path the technician used during the troubleshooting process. Augmented reality features may also be displayed on the technician's mobile device to facilitate finding the source of one or more leaks.

20 Claims, 9 Drawing Sheets

PERSONAL MOBILE SIGNAL EGRESS LOGGING AND AUGMENTED REALITY LEAK LOCATOR

BACKGROUND

Most cable network systems are coaxial-based broadband access systems that may take the form of all-coax network systems, hybrid fiber coax (HFC) network systems, or RF over glass (RFOG) network systems. Cable network system designs typically use a tree-and-branch architecture that permits bi-directional data transmission, including Internet Protocol (IP) traffic between the cable system head-end and customer locations. There is a forward or downstream signal path (from the cable system head-end to the customer location) and a return or upstream signal path (from the customer location back to the cable system head-end). The upstream and the downstream signals occupy separate frequency bands. In the United States, the frequency range of the upstream band is from 5 MHz to 42 MHz, 5 MHz to 65 MHz, 5 MHz to 85 MHz, or 5 MHz to 204 MHz, while the downstream frequency band is positioned in a range above the upstream frequency band.

Egress (also know as signal leakage) from the cable network system results from flaws in the cable network system that provide points of ingress for noise, which can reduce the quality of service of the system. This is undesirable.

Signal leakage monitoring has thus far been limited to vehicle mounted systems. This works well on average and meets the minimum plant monitoring requirements. However, there are many situations when the vehicle cannot get close enough to the source of a problem, requiring the technician to get out of the vehicle and attempt to isolate the problem on foot. In these situations, it is possible and sometimes likely that there may be multiple problems only discoverable on foot due to the small size of the plant defect, or even the multiplicity of the defect. These defects, however, currently go undiscovered as current test instruments do not acquire the proper data to lead the technician to the leak or leaks, leaving behind residual sources of plant ingress and impairment. This is undesirable.

In addition, most test systems display a pin on a map, requiring the technician to drive to that general location and walk around with his/her test instrument to find the leak. As can be appreciated, it is often too difficult to determine exactly where the leak was reported by just looking at a pin on a map. This difficulty also may increase the amount of time the technician spends troubleshooting the issue, which is undesirable.

Moreover, it is not currently possible to track the on-foot position of the technician during a repair visit to know what test path was taken or if he/she actually left the vehicle at all to attempt to fix the problems detected from the road. This is desirable for quality control and other purposes.

Accordingly, there is a need and desire for a test mechanism that supplements a vehicle mounted test instrument when it and the technician are required to leave the vehicle to locate leaks, including hard to find leaks.

SUMMARY

In one or more embodiments, a system, method and computer application are provided to log signal egress (leakage signal) readings from a test instrument during a "walkout" mode where the technician and test instrument have left a vehicle and troubleshooting is being performed on foot. Logged readings may include position (e.g., GPS data) and time data (e.g., a timestamp) from the technician's mobile device (e.g., smartphone, tablet, etc.) that is correlated to signal readings from the test instrument. This allows the disclosed embodiments to create a unique troubleshooting and discovery dataset capable of revealing problems not previously discoverable using vehicle mounted test instruments, even when they include a GPS or other positioning system. In addition, the dataset may be used for quality control and other purposes such as e.g., providing a report or mapping of the path the technician used during the troubleshooting process.

In one or more embodiments, the unique dataset is used to generate graphical and textual indicators on the technician's mobile device to help the technician find the location of leaks quicker. In one or more embodiments, the graphical indicators may include augmented reality features, which provide more information than the standard "pin on map" approach.

In one or more embodiments, a computer-implemented method is provided. The method being performed by a processor on a mobile device and comprises: determining that a test instrument is in a walkout mode of operation; using a positioning system of the mobile device to combine leakage signal data received from the test instrument with position data to create logged leakage signal data; transmitting the logged leakage signal data to an analysis service; receiving processed data corresponding to the logged leakage signal data from the analysis service; and updating a user interface displayed on the mobile device with one or more graphical features associated with a location of a source of the leakage signal data based on the processed data.

In one or more embodiments, a test system is provided. The system comprises a computer application to be executed by a processor on a mobile device to configure the processor to: determine that a test instrument is in a walkout mode of operation; use a positioning system of the mobile device to combine leakage signal data received from the test instrument with position data to create logged leakage signal data; transmit the logged leakage signal data to an analysis service; receive processed data corresponding to the logged leakage signal data from the analysis service; and update a user interface displayed on the mobile device with one or more graphical features associated with a location of a source of the leakage signal data based on the processed data.

DETAILED DESCRIPTION

Figure 1:
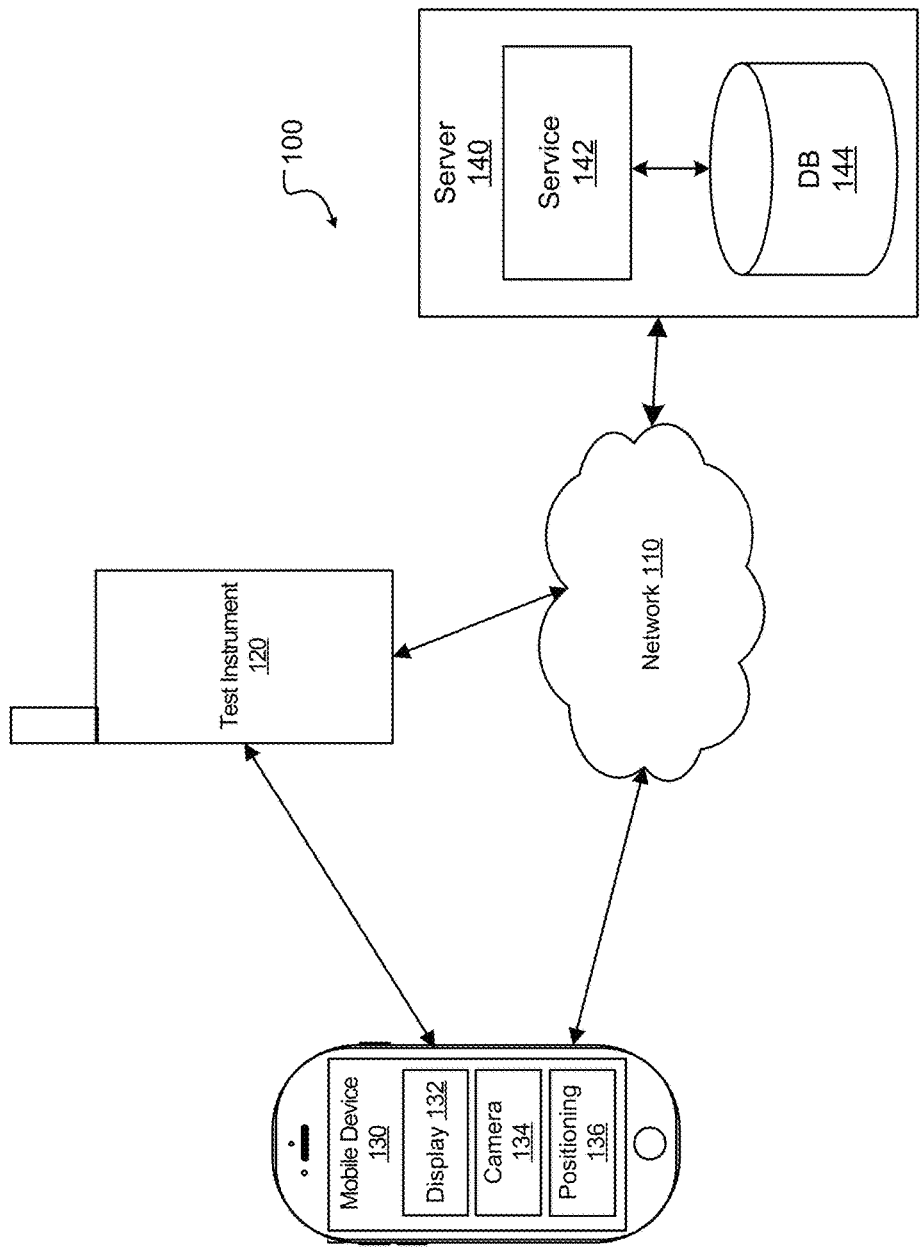
FIG. 1 illustrates a test system in accordance with an embodiment disclosed herein.

FIG. 1 illustrates a test system 100 in accordance with an embodiment disclosed herein. In the illustrated example, the system 100 includes a test instrument 120, mobile device 130 and a server 140. The test instrument 120 and mobile device 130 may communicate with the server 140 via a network 110 or cloud-based environment, which in the illustrated example is the Internet. In one or more embodiments, the mobile device 130 will be paired to and communicate directly with the test instrument 120 via a Bluetooth or Bluetooth Low Energy (BLE) connection.

In one or more embodiments, the test instrument 120 is a leakage detector that may be mounted in a vehicle for an "in-vehicle" mode of operation and also removable from the vehicle mount for a "walkout" mode of operation in which the technician troubleshoots on foot. An example of such a test instrument is an instrument from the Seeker family of leakage detectors manufactured and sold by VIAVI Solutions Inc., including the Seeker X and Seeker D with MCA III, which is modified to include the processing and features disclosed herein. As disclosed herein, the test instrument 120 monitors for and detects egress/leakage signals and generates data that is sent to the server 140 for processing, analysis and troubleshooting, among other things. When mounted in a vehicle, the test instrument 120 may include position information such as GPS information that is correlated to the egress/leakage signal data. The test instrument 120 transmits the data to the server 140 via the network 110 and receives e.g., processed/analyzed data for updating a display on the instrument 120 to help the technician locate the leak or leaks.

In the illustrated system 100, the mobile device 130 includes at least a display 132, which may be a touchscreen such as those used in smartphones and tablets, camera 134 and a positioning system 136 (e.g., GPS). Additional details of a computing device that be used as the mobile device 130 are discussed below with reference to FIG. 8. In one or more embodiments, the mobile device 130 will be paired to and communicate directly with the test instrument 120 via a Bluetooth or BLE connection. It should be appreciated that other wireless or wired connections could be used.

As discussed below with respect to FIG. 3, the mobile device 130 will execute an application configured to work with the test instrument 120 during the "walkout" mode of operation. In one embodiment, the application is a technician productivity application offered by VIAVI Solutions Inc., including the Mobile Tech Application, which is modified to include the processing and features disclosed herein. For example, during the "walkout" mode, the mobile device 130 (via the application or other programmed instructions) will serve as a data collector and position logger (via the positioning system 136), and that logged data is used by the server 140 to track the position of the technician as well as the leakage signal values seen on the ground much closer to the expected position as determined from road based initial observations. In addition, the mobile device 130 will receive processed data from the server 140 and may display user interfaces that include graphical and or textual indicators to help the technician find the location of leaks quicker. In one or more embodiments, the processing on the mobile device 130 will use API (application programming interface) requests based on the logged and processed data to obtain and display graphical indicators that include the surrounding environment and augmented reality features (e.g., from a map service) that are included in or superimposed on a live image taken via the camera 134.

In the illustrated system 100, the server 140 includes a service 142 and a non-transitory memory storing a database 144. Additional details of a computing device that may serve as the server 140 are discussed below with reference to FIG. 8. The service 142 is configured to work with the test instrument 120 and mobile device 130 to facilitate egress monitoring and detection and identify the possible location/locations of the egress source. In one embodiment, the service is a leakage analysis service offered by VIAVI Solutions Inc., including the Leakage Analysis Workshop (LAW) service, which is modified to include the processing and features disclosed herein. The database 144 is used to store and retrieve data that may be analyzed to detect the location or locations of the egress/leakage. In addition, the database 144 may be used to store and retrieve data that can be used to determine, report and or map the path the technician took during the troubleshooting process.

Figure 2:
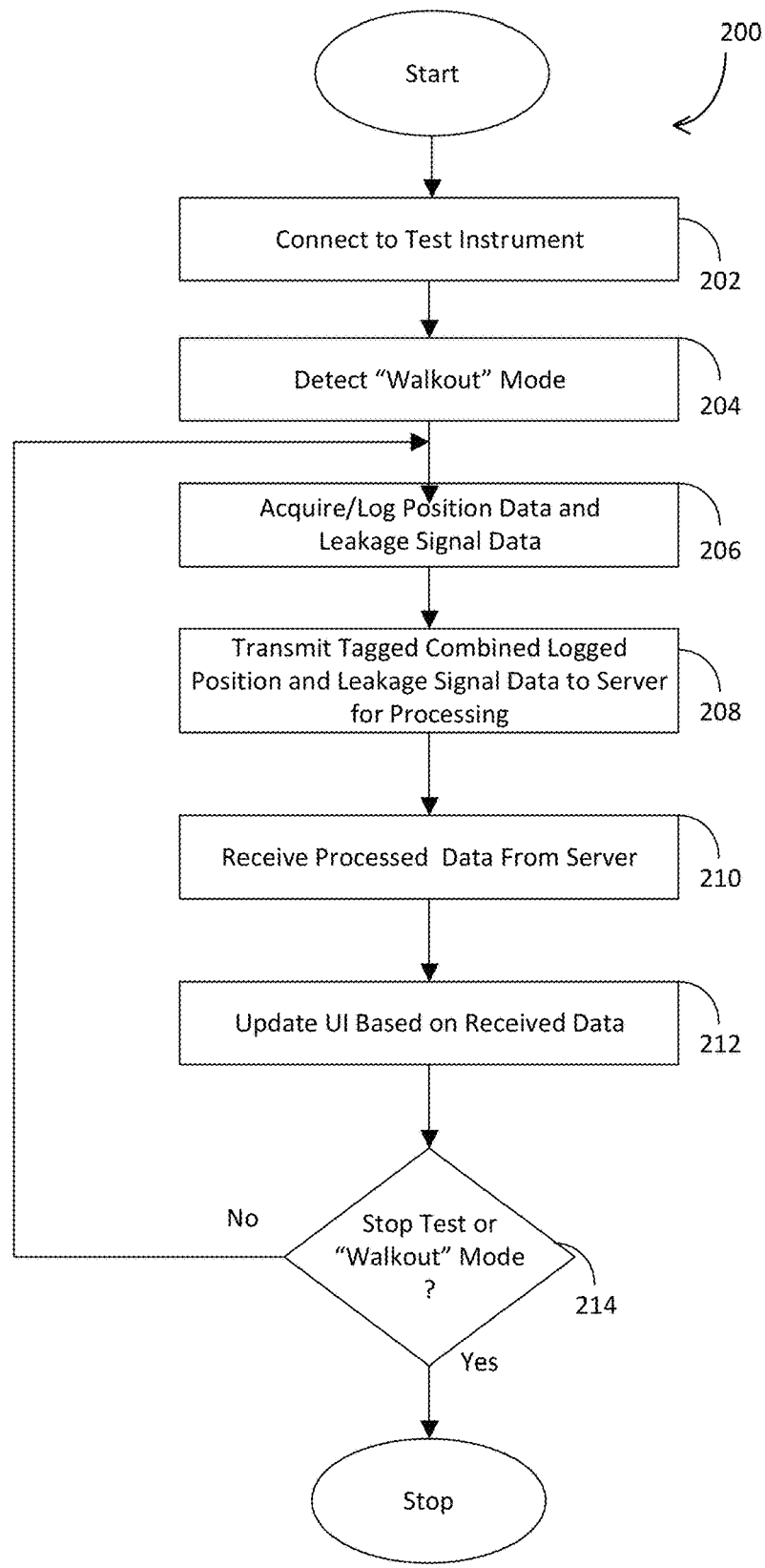
FIG. 2 illustrates example processing performed by the mobile device illustrated in FIG. 1 performed in accordance with an embodiment disclosed herein.

FIG. 2 illustrates example processing 200 performed by the mobile device 130 illustrated in FIG. 1. In one or more embodiments, the process 200 is implemented via computer executable instructions stored in a non-transitory memory of the mobile device 130 that are executed by the device's processor. In one or more embodiments, the computer executable instructions are part of the Mobile Tech application (discussed above) that has been modified to include the disclosed processing. The process 200 may be activated by a user upon activation of a hardware or software control (e.g., selecting and or double clicking on an icon associated with the process 200 or Mobile Tech application) or it may be automatically executed as part of a startup process of the mobile device 130.

Regardless of how the process 200 is activated, the process 200 begins at step 202 when the mobile device 130 is paired to and or connected to the test instrument 120. As noted above, in one or more embodiments, the mobile device 130 will be paired to and or connected to the test instrument 120 via a Bluetooth or BLE connection BLE. Step 202 can be performed automatically upon the activation of the process 200 or upon detection of the test instrument 120, among other options. In addition, or alternatively, step 202 may be performed as a manual process whereby the user is prompted to initiate and or confirm the pairing operation.

At step 204, the mobile device's processor will detect that the test instrument 120 has entered the "walkout" mode. For example, when the test instrument 120 is removed from the vehicle mount, the instrument 120 can send a signal or message to the mobile device 130 indicating that the "walkout" mode is now the current operating mode of the instrument 120. In one or more embodiments, this step could occur automatically once the mobile device 130 is connected to or paired with the test instrument 120 or it can be performed manually by the technician by selecting an option on either the test instrument 120 or mobile device 130.

During the "walkout" mode, the processor of the mobile device 130 acquires the position/location of the mobile device (corresponding to the position of the technician) and logs received leakage signal data using the position data and a time stamp at step 206. The position data may be retrieved from the mobile device's positioning system 136 and the leakage signal data may be received from the test instrument 120.

At step 208, combined/logged leakage signal data (i.e., signal data logged with the position data and timestamp) are tagged as "walkout" data and transmitted to the server 140 for further processing and analysis. That is, each pair of leakage signal data and its corresponding position data are associated with a timestamp. As discussed below in more detail, the service 142 running on the server 140 uses the logged data (tagged specifically as "walkout" data) for further analysis and potentially permanent logging within the system 100. The analysis by the service 142 will facilitate egress/leakage monitoring and detection and identify the possible location/locations of the egress/leakage source. This analysis is made available to the mobile device 130 by transmitting processed data to the mobile device 130.

At step 210, the processed data is received from the server 140. This processed data may be used by the mobile device's 130 processor to update a user interface (UI) displayed on the device's display 132 at step 212. It should be noted that while live data can be fed to the server 140, processed and passed back to the mobile device 130 this can be slightly time consuming. Accordingly, it may be desirable to collect and transmit logged data or other leakage signal data during the "walkout" and/or "in-vehicle" modes at a first time, but then have it processed and or made data available to the mobile application at a later time (e.g., at a follow up visit once the data has been refined to fewer more meaningful points or leakage locations). In one embodiment, data may be collected and transmitted during the "in-vehicle" mode first as it is the quickest way to get data collected and analyzed by the server 140. On a subsequent troubleshooting visit, the technician would take full advantage of the prior intelligence/data gathering and analysis during the "walkout" mode, allowing him/her to use the augmented reality feature and to collect additional data for processing by the server 140 using the "walkout" logged data collection feature.

The displayed information can include graphical and or textual indicators overlayed on, or adjacent to, on a map of the area currently being displayed on the UI. The displayed information can include a leakage marker where the egress/leakage source is potentially located. This leakage marker may be displayed with a unique character or symbol, could be in a bright color in contrast to the remaining portions of the UI, and or could be displayed as an animated object along with audible or haptic indicators to direct the technician's attention to the potential source or sources. In addition, other markers referred to as "supporting points" may be displayed indicating observations where the leakage signal was detected leading up to the location identified by the leakage marker.

Figure 4:
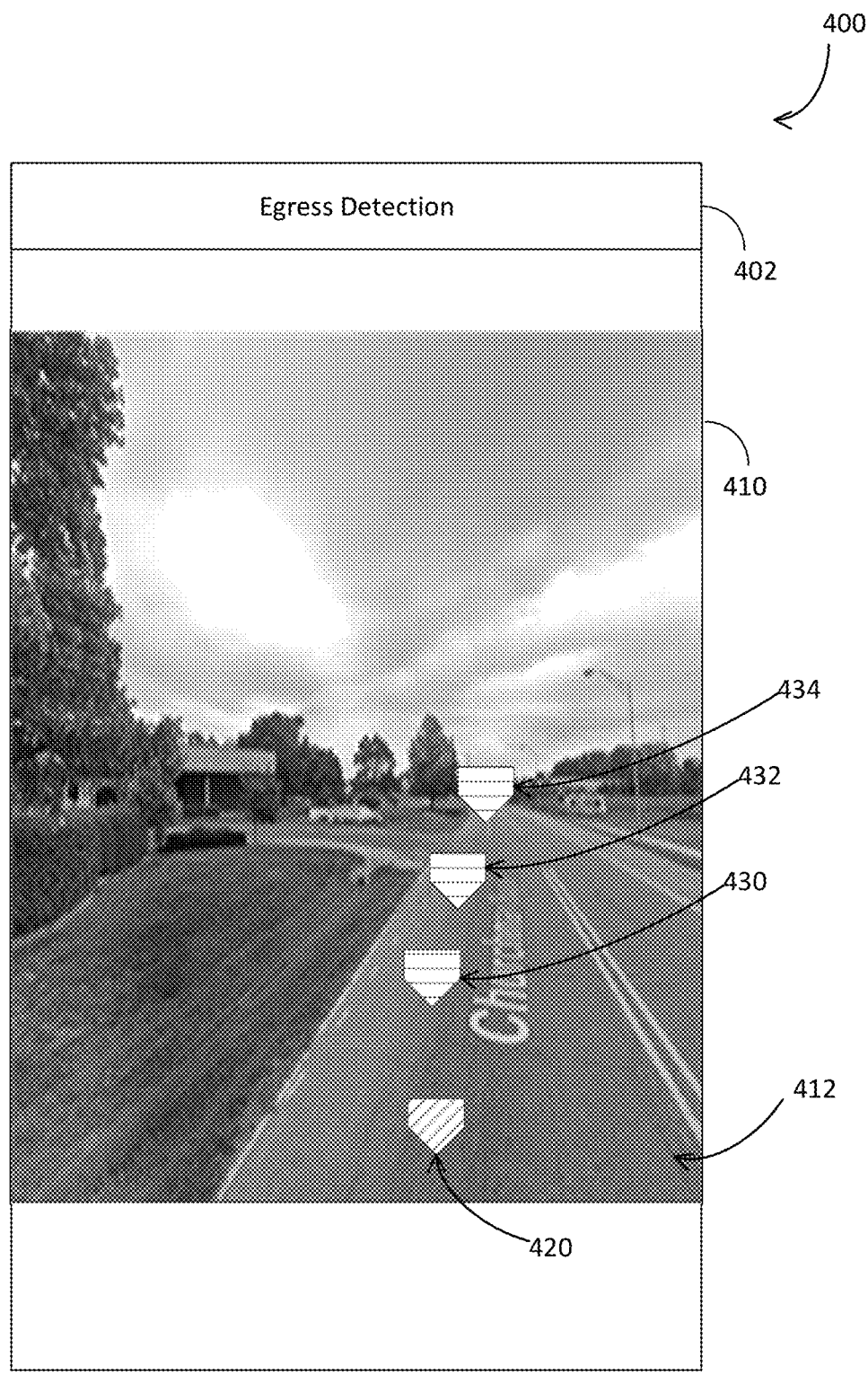
FIG. 4 illustrates an example user interface (UI) displaying markers on a street view in accordance with an embodiment disclosed herein.

An example user interface (UI) 400 displaying these markers on a street view map is illustrated in FIG. 4. In the illustrated example, the UI 400 contains a header portion 402 to identify what is being shown in the UI 400 (i.e., "Egress Detection"). The illustrated example further includes a detection display portion 410, which in the illustrated example includes a street view 412 based on the processed data received from the server 140 and or the application running on the mobile device 130. As can be appreciated, the street view 412 corresponds to the location of the mobile device 130 as determined by its positioning system 136. In the illustrated example, there is one leakage marker 420 and three supporting point markers 430, 432, 434, which have a slightly different appearance than the leakage marker 420. It should be appreciated that more or less supporting point markers may be displayed.

In accordance with another aspect disclosed herein, with the underlying data corresponding to these markers being geolocated (i.e., due to the logged leakage signal data in accordance with the disclosed principles), the mobile device's processor can add augmented reality features that may be included in or superimposed on a live image taken via the camera 134 and displayed on the UI. For example, as the technician is walking towards the potential leakage site from the vehicle, he/she can hold up the mobile device 130 and point its camera 134 in the general direction of the leak. The camera view will be a real time view of the surrounding area that can be supplemented by an augmented reality feature (e.g., moving and or rotating arrows, and other animated or static images corresponding to the surrounding area of the test location, amplifiers, pedestals, and prior repair sites or leaks, among other things) providing a virtual indicator of the leak so the technician can walk straight towards it.

Figure 5B:
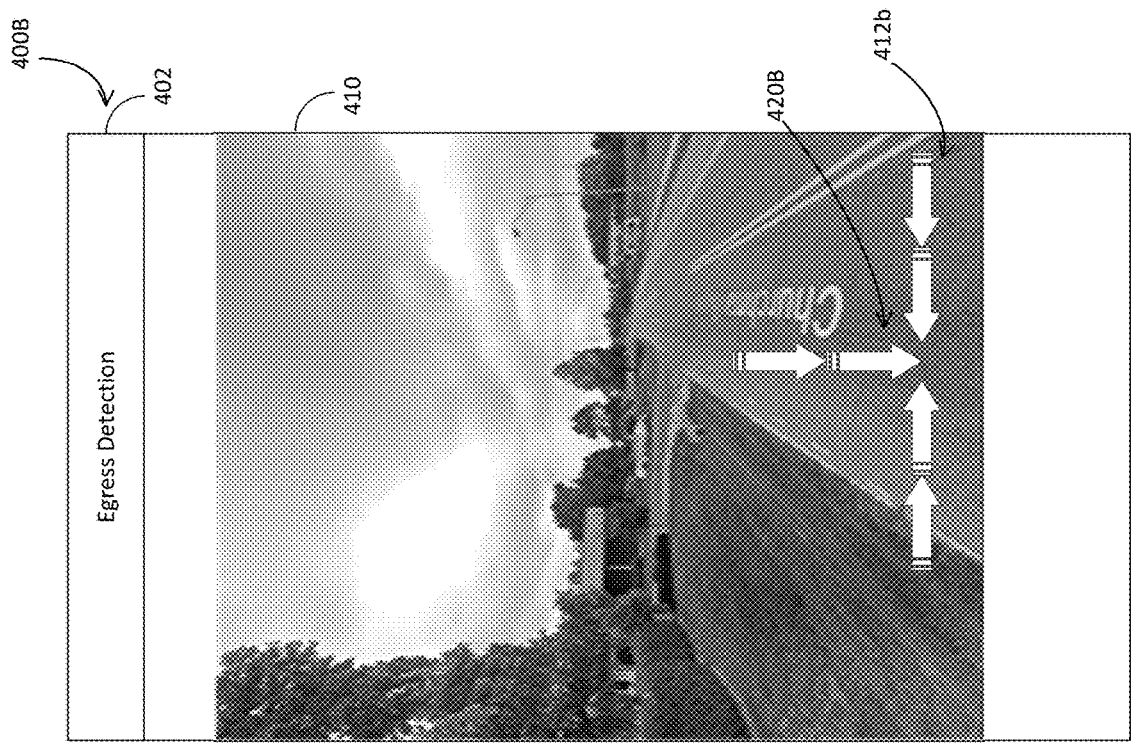
FIGS. 5A-5B illustrate an example user interface (UI) displaying augmented reality features on a street view in accordance with an embodiment disclosed herein.
Figure 5A:
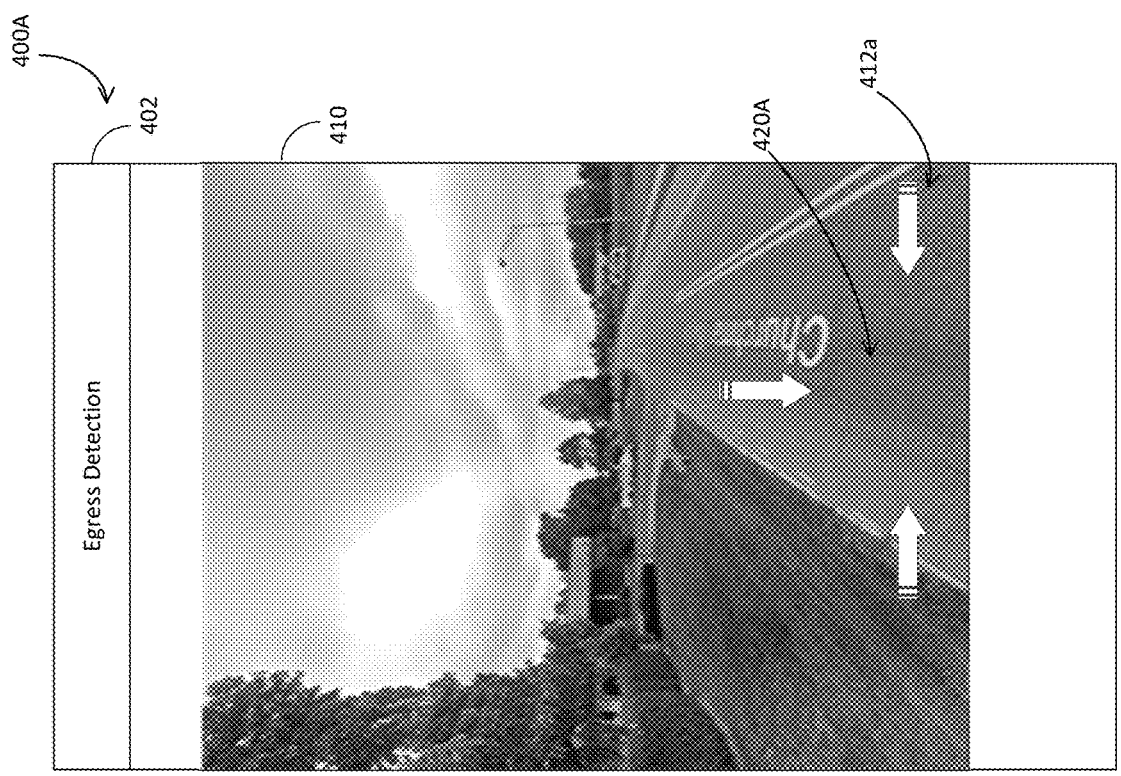

FIG. 5A shows a modified user interface (UI) 400a that replaced the markers illustrated in FIG. 4 with an augmented reality feature 420a. In the illustrated example, the street view 412a is an image from the mobile device's camera and the augmented reality feature 420a consists of a first set of arrows pointing towards the potential leakage source. FIG. 5B shows a further modified user interface (UI) 400b with another augmented reality feature 420b that consists of a second set of arrows pointing towards the potential leakage source overlapping a street view 412b image from the mobile device's camera. The arrows of the two UI's 400a, 400b will appear to be animated such that in a first phase there is only the first set of arrows and, in a second phase, the second set of arrows are added, making it seem that there is movement towards the leakage source. This switching from UI 400a to 400b can continue for a predetermined time and or until there is more movement by the technician (as detected by the mobile device's positioning system).

The augmented reality display features may reduce the time it takes for the technician to find the exact reported location of the leak. This is particularly helpful when the target location is much less conveniently located such as e.g., behind a house, in a rear easement of a property, or somewhere within a multiple dwelling unit such as an apartment complex.

In one or more embodiments, the augmented reality feature may be implemented as an API call/request to a traditional mapping service (e.g., GOOGLE MAPS). For example, GOOGLE has an API available for development allowing the use of augmented reality features with its GOOGLE MAPS service. The process 200 could utilize this technology to generate API calls/requests using the mobile device's positioning data and other information to implement the surroundings and augmented reality features discussed herein.

Figure 6B:
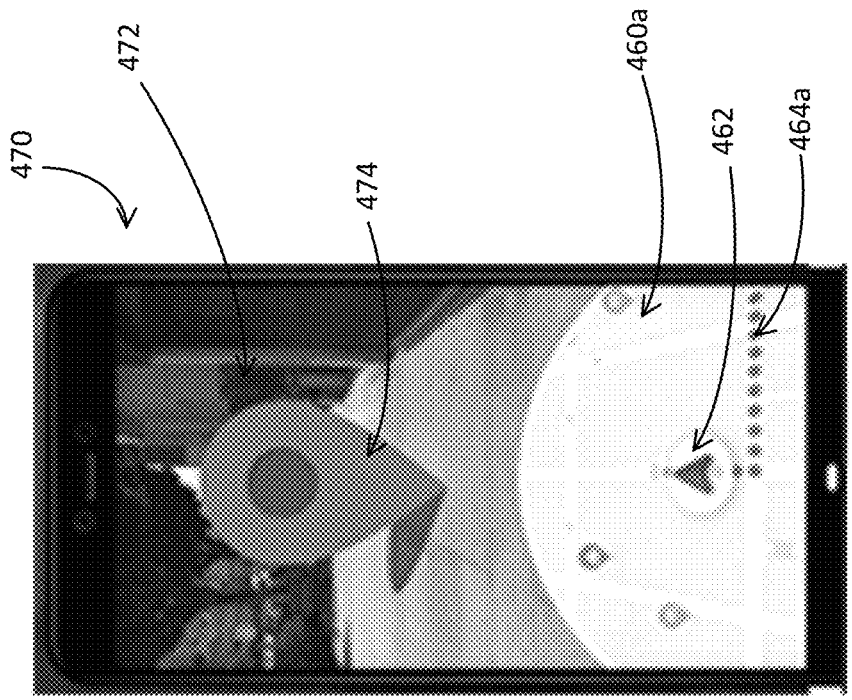
FIGS. 6A-6D illustrate example user interfaces (UI) displaying augmented reality features in accordance with other example embodiments disclosed herein.
Figure 6A:
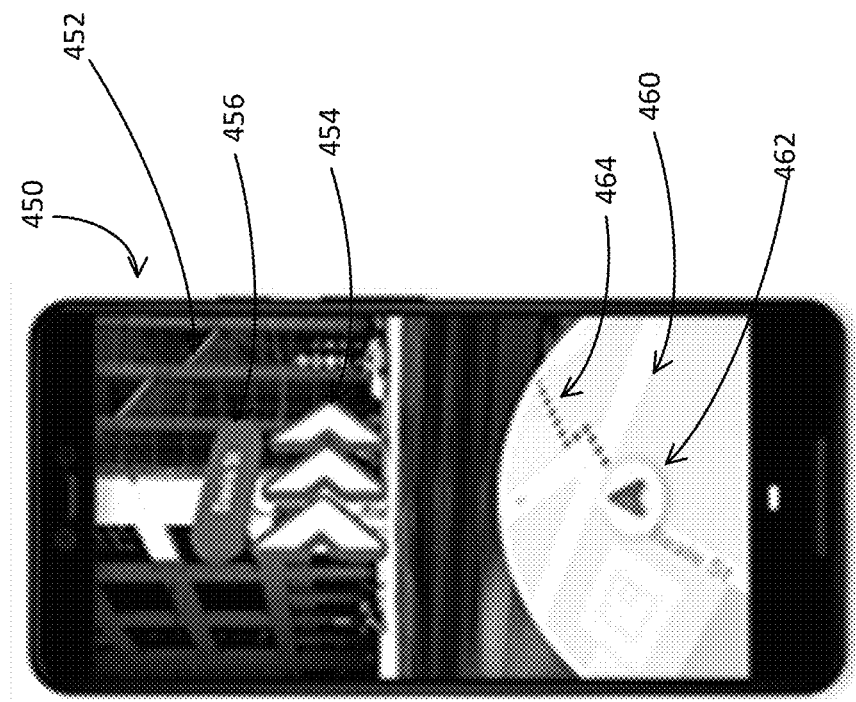

Example UIs displaying additional augmented reality features are illustrated in FIGS. 6A-6D. FIG. 6A illustrates an example UI 450 having an augmented reality portion 452 and map portion 460. The augmented reality portion 452 has an animated set of arrows 454 and a text portion 456 providing a street name to assist the technician on its path. The animation may include the sequencing of arrows in three phases—one phase with one arrow, a second phase with two arrows and a third phase with three arrows, which simulate a pointing movement. Other animations (e.g., spinning, rotating, bouncing, etc.), audible and haptic indicators may be used if desired. The surroundings include an image from the mobile device's camera and could include other features received in response to the API request. The map portion 460 includes an indicator 462 showing the position of the technician and a path portion 464 guiding the technician to the potential leakage source.

FIG. 6B illustrates an example UI 470 having an augmented reality portion 472 and map portion 460a. The augmented reality portion 472 has an animated balloon marker 474 often used by popular map programs. The animation may include spinning, bouncing or any other movement. The surroundings include an image from the mobile device's camera and could include other features received in response to the API request. The map portion 460a includes an indicator 462 showing the position of the technician and a path portion 464a showing the path taken by the technician up to this point.

Figure 6D:
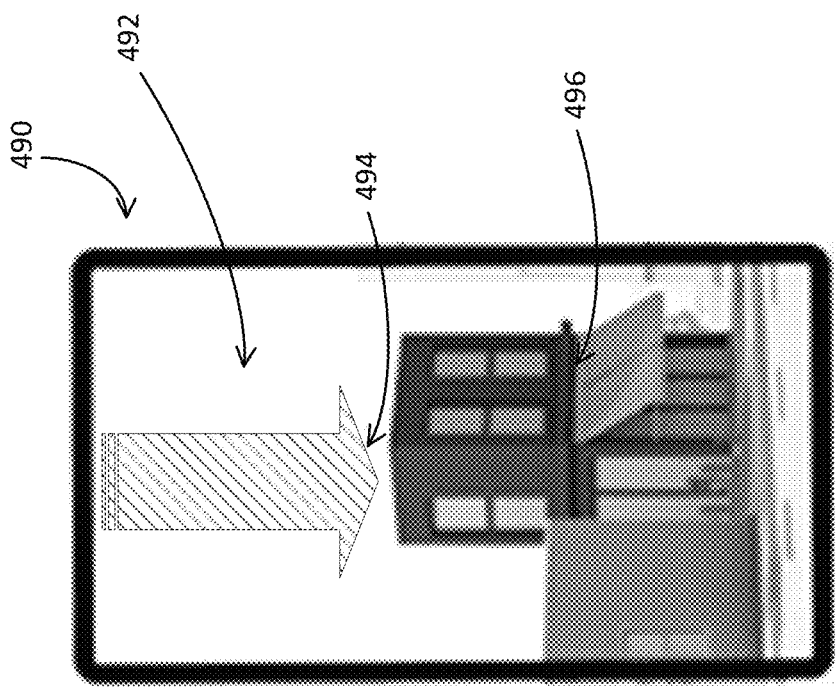
Figure 6C:
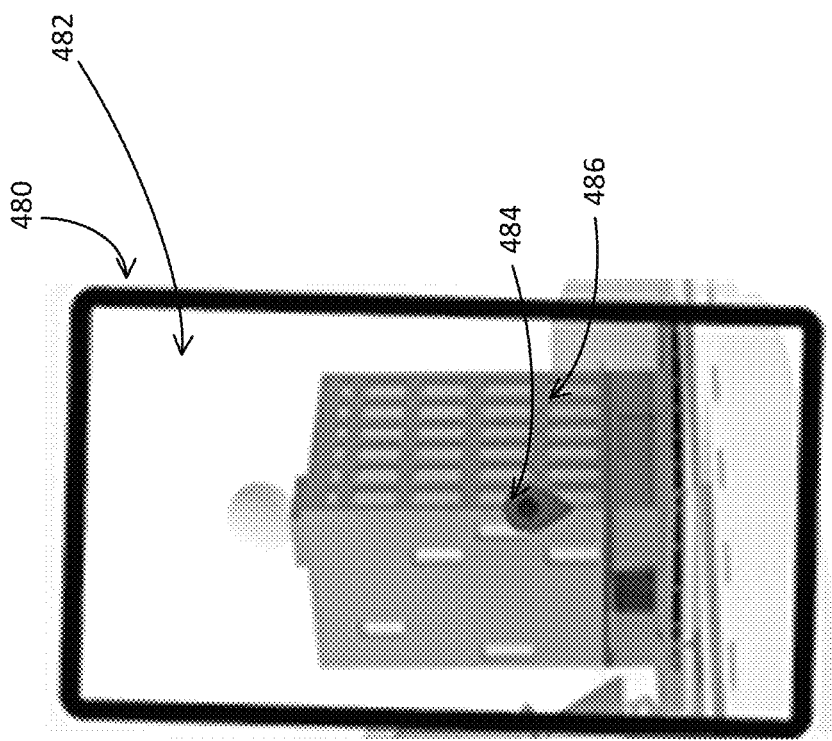

FIG. 6C illustrates an example UI 480 having an augmented reality portion 482 consisting of an animated balloon marker 484 placed in front of a building 486 that is included in the area around the source of egress/leakage. FIG. 6D illustrates an example UI 490 having an augmented reality portion 492 consisting of an animated arrow marker 494 pointing behind a building 496 that is included in the area around the source of egress/leakage. UI 490 is an example of how augmented reality can help a technician locate a leak quicker by alerting the technician that the source may be behind the building.

Figure 7:
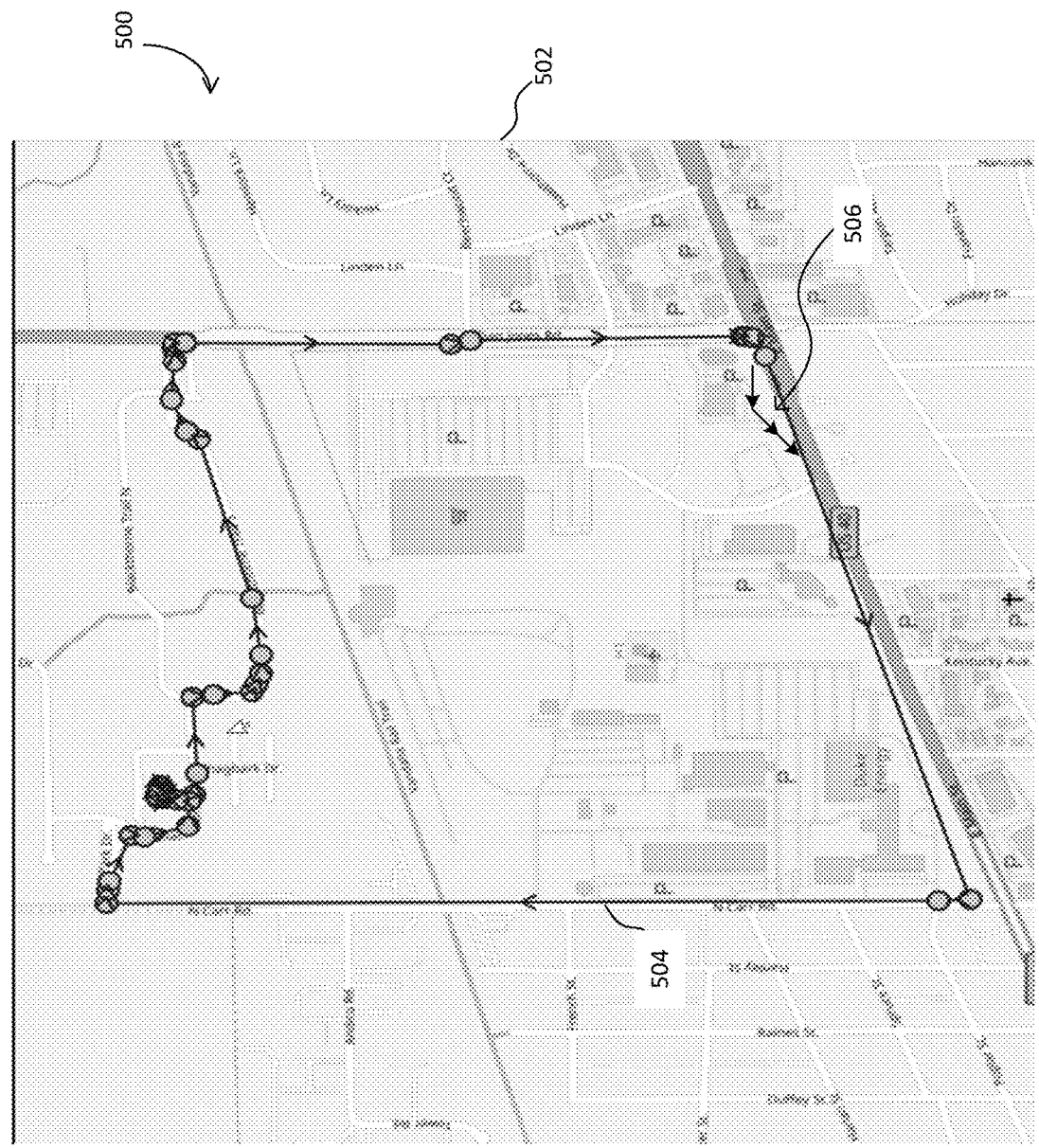
FIG. 7 is an example UI displaying the technician's path on a street view map in accordance with an embodiment disclosed herein.

In addition, if included in the processed data, the technician's path may also be displayed on a user interface with different labeling or marking. An example UI 500 displaying the technician's path 506 on a street map 502 is illustrated in FIG. 7. The UI 500 may also include the vehicle's path 504 on the map 502. This UI 500 may be displayed on the technician's mobile device to show the technician of his/her troubleshooting route. Moreover, for quality control purposes, the UI 500 may be generated on another device or included in a report to management or other personnel to determine what the technician has done. For example, the UI or report can help visualize the paths taken (on foot or in the vehicle), and can include the duration of time for each part of the troubleshooting, length of each path, and if a "strand map"/layout of the physical cable plant has been included/uploaded to the device, can report a percentage of that plant covered/correlated to the recorded path. These features are only available by the disclosed principles' identification of the "walkout" and "in-vehicle" modes, and the logging and processing of the leakage data as described above.

Returning to FIG. 2, at step 214, the mobile device's processor determines whether the technician has stopped his/her leakage signal test and or if the test instrument 120 has exited the "walkout" mode (and has entered the "in-vehicle" mode). If it is determined that the technician has stopped testing or if the test instrument 120 has exited the "walkout" mode (i.e., a yes at step 214), the process 200 terminates. However, if it is determined that the technician has not stopped testing and that the test instrument 120 has not exited the "walkout" mode (i.e., a no at step 214), the process 200 continues at step 206 where more leakage signals are logged (as discussed above).

Figure 3:
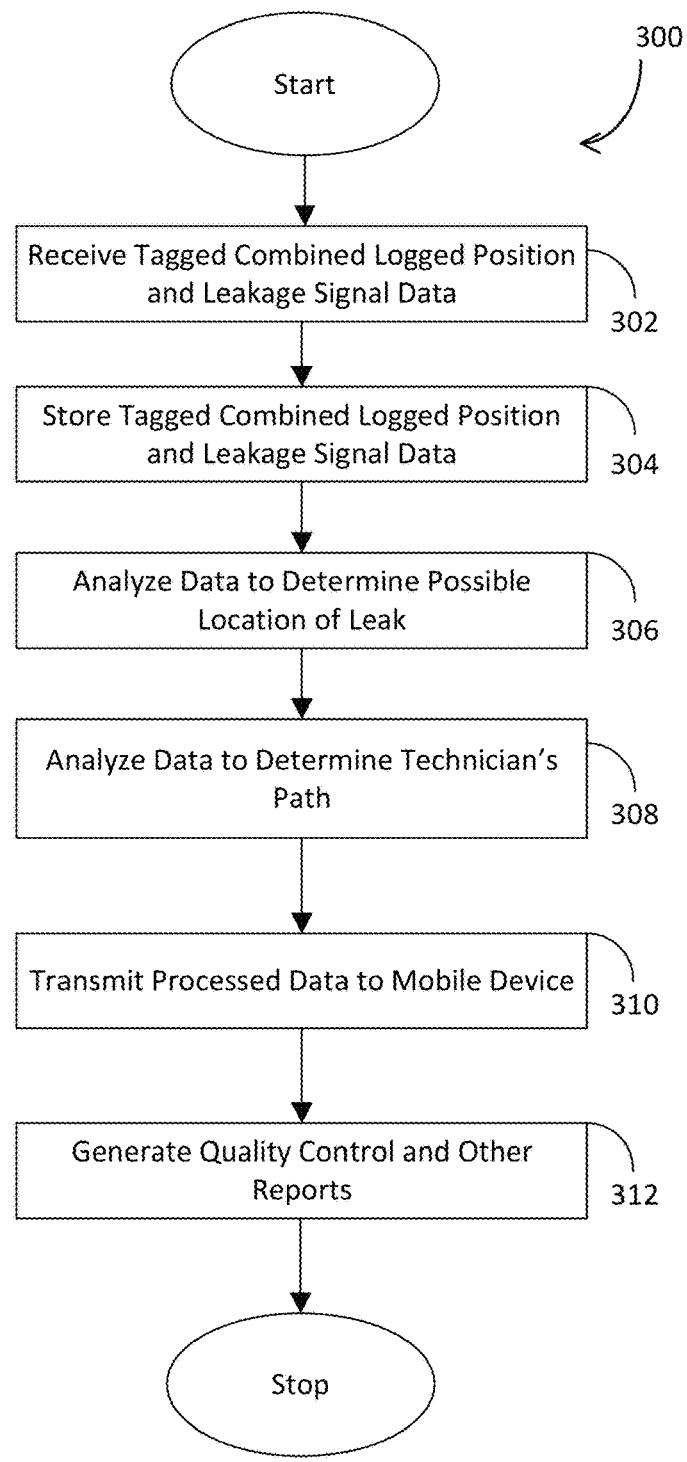
FIG. 3 illustrates example processing performed by the server illustrated in FIG. 1 performed in accordance with an embodiment disclosed herein.

FIG. 3 illustrates example processing 300 performed by the server 140 illustrated in FIG. 1. In one or more embodiments, the process 300 is implemented via computer executable instructions stored in a non-transitory memory of the server 140 that are executed by the server's processor. In one or more embodiments, the computer executable instructions are part of the service 142 (e.g., LAW service discussed above) performed by the server 140, which has been modified to include the disclosed processing.

At step 302, the server 140 receives the tagged combined/logged leakage signal data (i.e., signal data logged with the position data and timestamp) generated and transmitted by the mobile device 130 (e.g., at steps 206-208 of FIG. 2). Although not shown, the processor would look for the "walkout" tag before proceeding with aspects relevant to that mode. In one or more embodiments, the process 300 may be initiated after the server's processor detects the "walkout" tag in received data.

At step 304, the received tagged combined/logged leakage signal data is stored e.g., in the server's database 144 or other non-transitory memory. This allows the server 140 to retrieve and analyze the "walkout" data at a later time if required. At step 306, the received tagged combined/logged leakage signal data is analyzed to determine one or more possible locations of the source or sources of egress, etc. For example, the "walkout" data will have more refined GPS information that may be analyzed in addition to the strength of the signals received at each location.

At step 308, the server 140 may analyze the "walkout" data to determine the path of the technician during the walkout portion of the test. This information may be stored for later use (see e.g., step 312) or it may be included in data sent back to the mobile device 130.

At step 310, the results of the analysis at step 306 and optionally step 308 are transmitted to the mobile device 130 as processed data that may include, among other things, one or more locations of potential leakage sources, which can be displayed as the leakage marker or supporting points by the mobile device 130, and the technician's path (if determined) so that it may also be displayed on the mobile device 130 (if desired).

At step 312, using stored "walkout" data, the server 140 can generate and output a quality control report outlining and or illustrating the path taken by the technician. This may be useful for ensuring that the service provider is fulfilling its maintenance and repair obligations and for employee evaluations.

As can be appreciated, by allowing the technician's mobile device to serve as a data collector and GPS position logger, the disclosed principles can capture for analysis and quality control tracking the position of the technician as well as the signal egress/leakage signal values seen on the ground much closer to the expected position as determined from road based initial observations. This allows the disclosed system, method and application to see much lower value leaks that would not have been observed at all from the vehicle testing alone.

Furthermore, the geocoded "walkout" data allows the disclosed principles to see multiple sources of leaks that may have appeared to be a single "leak" from the road-based point of observation. As noted above, the disclosed principles can track where the technician actually was during a troubleshooting session to determine how often particular technicians actually leave the vehicle and perform these walkouts, and how far they explore the trouble areas and for how long, in addition to providing much better overall system integrity by tracking and eliminating smaller leaks that would have otherwise been missed.

In addition, the layout and content of the disclosed user interfaces provide the technician with a unique and focused amount of data in a single screen view of the device. That is, the technician is not directed to a different page or menu item during the troubleshooting process while test instrument and other data associated with the leakage signal data is being processed. Accordingly, technicians are provided with an interactive and graphical user interface that provides all necessary interfaces in one screen and with a limited and or specific amount of data via the interfaces provided by the disclosed principles.

Figure 8:
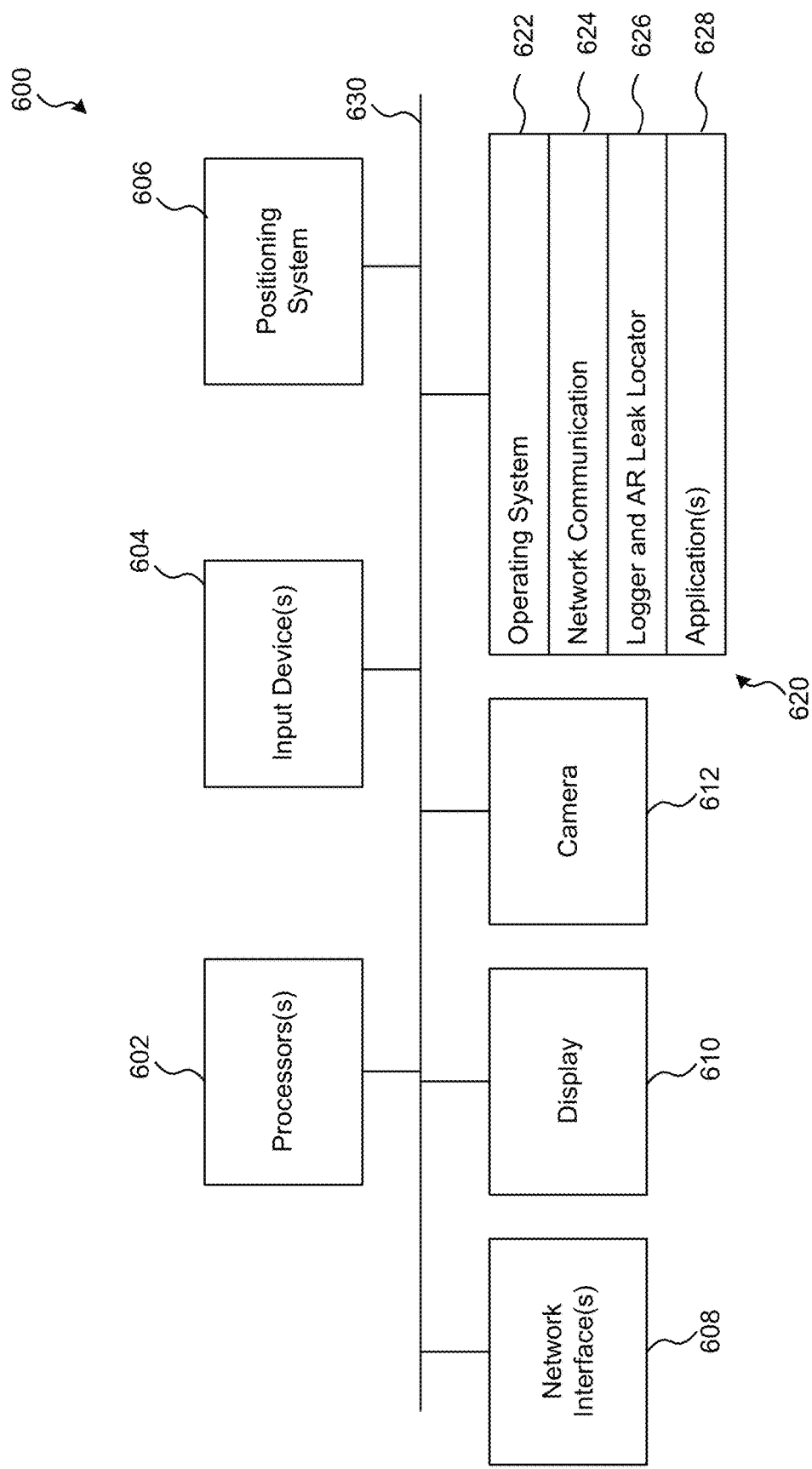
FIG. 8 is an example computing device that may be used in the system illustrated in FIG. 1.

FIG. 8 is a block diagram of an example computing device 600 that may implement various features and processes as described herein. The computing device 600 may be any electronic device that runs software applications derived from compiled instructions, including without limitation servers, personal computers, smartphones, media players, electronic tablets, game consoles, email devices, etc. In some implementations, the computing device 600 may include one or more processors 602, one or more input devices 604, one or more display devices 610, one or more network interfaces 608, one or more non-transitory computer-readable media 620. Each of these components may be coupled by a bus 630. Computing device 600 may be used as the server 140 or mobile device 130 of system 100. When the computing device 600 is a smartphone or tablet (e.g., mobile device 130), it may also include a positioning system 606 (e.g., GPS) and or camera 612.

Display device 610 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 630 may be any known internal or external bus technology, including but not limited to ISA, EISA, PCI, PCI Express, USB, Serial ATA or FireWire. Computer-readable medium 620 may be any non-transitory medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 620 may include various instructions 622 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 610; keeping track of files and directories on computer-readable medium 620; controlling peripheral devices (e.g., disk drives, printers, etc.) which can be controlled directly or through an I/O controller; and managing traffic on bus 630. Network communications instructions 624 may establish and maintain network connections (e.g., software for implementing communication protocols, such as TCP/IP, HTTP, Ethernet, telephony, etc.).

Logger and Augmented Reality (AR) Leak instructions 626 may include instructions that implement the various processes 200, 300 described herein. Application(s) 628 may be an application that uses or implements the processes described herein and/or other processes. The processes may also be implemented in operating system 622.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As can be appreciated, the disclosed systems, methods and applications provide several advantages over conventional egress/leakage detection systems. For example, vehicle mounted systems are limited to spaces where the vehicle can travel freely and the distance that the roadway is from the source of signal egress/leakage. This can be very limiting at times and can put such a distance between the detection system and the problem source such as not to "hear" it at all. By implementing the disclosed walkout logging in a test system, the disclosed principles are extending detection capabilities to detect small leaks that could not be heard from the road and too hard to find leaks. As an additional benefit, the disclosed principles will log the time and locations of the technician during the troubleshooting process, which will allow supervisors and other personnel to confirm that technicians are actually attempting to find problems predicted from the road.

Moreover, current systems merely display a pin on a map, requiring the technician to drive to a general location and walk around with their leakage instrument to find the leak. By incorporating augmented reality functionality, the disclosed principles could possibly speed up the process of finding the location of the leak by putting a visual indicator on the map that the technician can walk straight towards.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method, said method being performed by a processor on a mobile device and comprising:
    determining that a test instrument is in a walkout mode of operation based on receiving a signal from the test instrument indicative of the walkout mode;
    using a positioning system of the mobile device to combine leakage signal data received from the test instrument with position data to create logged leakage signal data;
    transmitting the logged leakage signal data to an analysis service;
    receiving processed data corresponding to the logged leakage signal data from the analysis service; and
    updating a user interface displayed on the mobile device with one or more graphical features associated with a location of a source of the leakage signal data based on the processed data.

2. The method of claim 1, further comprising attaching a timestamp to each pair of leakage signal data and position data in the logged leakage signal data.

3. The method of claim 1, further comprising tagging the logged leakage signal data as walkout data prior to transmitting the logged leakage signal data to the analysis service.

4. The method of claim 1, further comprising displaying one or more augmented reality features on the user interface displayed on the mobile device associated with the location of the source of the leakage signal data based on the processed data.

5. The method of claim 4, wherein displaying one or more augmented reality features on the user interface further comprises:
    using a camera of the mobile device to capture a live view of an area;
    transmitting an application program interface request to obtain the one or more augmented reality features associated with the location of the source of the leakage signal data from a map service; and
    superimposing the one or more augmented reality features over the live view.

6. The method of claim 4, wherein the one or more augmented reality features comprise directional features pointing towards one or more leaks associated with the logged leakage signal data.

7. The method of claim 4, wherein the one or more augmented reality features comprise features of a surrounding area of one or more leaks associated with the logged leakage signal data.

8. The method of claim 1, wherein the one or more graphical features associated with the location of the source of the leakage signal data comprises a leakage marker and one or more supporting points, the leakage marker being associated with the location of the source of the leakage signal data and the supporting points indicating where leakage signals were detected leading up to the location of the source of the leakage signal data.

9. The method of claim 1, further comprising updating the user interface to display a path of a technician taken during the walkout mode.

10. The method of claim 1, wherein determining that the test instrument is in the walkout mode of operation comprises pairing the mobile device to the test instrument prior to receiving the signal indicative of the walkout mode.

11. A test system comprising:
    a computer application to be executed by a processor on a mobile device to configure the processor to:
    determine that a test instrument is in a walkout mode of operation based on receiving a signal from the test instrument indicative of the walkout mode;
    use a positioning system of the mobile device to combine leakage signal data received from the test instrument with position data to create logged leakage signal data;
    transmit the logged leakage signal data to an analysis service;
    receive processed data corresponding to the logged leakage signal data from the analysis service; and
    update a user interface displayed on the mobile device with one or more graphical features associated with a location of a source of the leakage signal data based on the processed data.

12. The test system of claim 11, wherein the processor is further configured to attach a timestamp to each pair of leakage signal data and position data in the logged leakage signal data.

13. The test system of claim 11, wherein the processor is further configured to tag the logged leakage signal data as walkout data prior to transmitting the logged leakage signal data to the analysis service.

14. The test system of claim 11, wherein the processor is further configured to display one or more augmented reality features on the user interface displayed on the mobile device associated with the location of the source of the leakage signal data based on the processed data.

15. The test system of claim 14, wherein the processor is configured to display one or more augmented reality features on the user interface by:
  using a camera of the mobile device to capture a live view of an area;
  transmitting an application program interface request to obtain the one or more augmented reality features associated with the location of the source of the leakage signal data from a map service; and
  superimposing the one or more augmented reality features over the live view.

16. The test system of claim 14, wherein the one or more augmented reality features comprise directional features pointing towards one or more leaks associated with the logged leakage signal data.

17. The test system of claim 14, wherein the one or more augmented reality features comprise features of a surrounding area of one or more leaks associated with the logged leakage signal data.

18. The test system of claim 11, wherein the one or more graphical features associated with the location of the source of the leakage signal data comprises a leakage marker and one or more supporting points, the leakage marker being associated with the location of the source of the leakage signal data and the supporting points indicating where leakage signals were detected leading up to the location of the source of the leakage signal data.

19. The test system of claim 11, wherein the processor is further configured to update the user interface to display a path of a technician taken during the walkout mode.

20. The test system of claim 11, wherein the processor is further configured to determine that the test instrument is in the walkout mode of operation by pairing the mobile device to the test instrument prior to receiving the signal indicative of the walkout mode.

* * * * *